United States Patent
Haley et al.

[11] 3,830,685
[45] Aug. 20, 1974

[54] POLYURETHANES REINFORCED BY POLYVINYL ALCOHOL CORD

[75] Inventors: John S. Haley, Lake Junaluska; Jerry W. Cooper; Arthur D. Logan, both of Waynesville, all of N.C.

[73] Assignee: Dayco Corporation, Dayton, Ohio

[22] Filed: Apr. 20, 1972

[21] Appl. No.: 245,910

Related U.S. Application Data

[63] Continuation-in-part of Ser. No. 71,237, Sept. 10, 1970, abandoned.

[52] U.S. Cl. ............... 161/88, 161/170, 161/176, 161/190, 161/89, 156/110, 156/137, 260/859 R, 260/77.5 A, 117/138.8
[51] Int. Cl. ............... D06m 15/52, D02g 3/48
[58] Field of Search ............... 161/89, 142–144, 161/169, 170, 190; 156/110 C, 137, 88, 89; 117/138.8; 260/859 R

[56] References Cited
UNITED STATES PATENTS

| | | | |
|---|---|---|---|
| 3,496,042 | 2/1970 | Wyness | 161/89 |
| 3,607,502 | 9/1971 | Marzochi | 156/137 |
| 3,656,360 | 4/1972 | Fix | 161/144 |

FOREIGN PATENTS OR APPLICATIONS

| | | | |
|---|---|---|---|
| 804,669 | 11/1958 | Great Britain | 161/190 |
| 1,905,551 | 8/1969 | Germany | 117/138.8 |

*Primary Examiner*—George F. Lesmes
*Assistant Examiner*—R. J. Roche

[57] ABSTRACT

A reinforced composition of improved physical properties is obtained by incorporating polyvinyl alcohol cords or fabrics into curable liquid urethane prepolymers. A strong chemical adhesion is obtained between the polyvinyl alcohol and urethane.

8 Claims, 4 Drawing Figures

PATENTED AUG 20 1974  3,830,685

3,830,685

POLYURETHANES REINFORCED BY POLYVINYL ALCOHOL CORD

BACKGROUND OF THE INVENTION

This application is a continuation-in-part of U.S. application Ser. No. 71,237, filed Sept. 10, 1970, now abandoned.

Heretofore, products such as power transmission belts, snowmobile tracks, and other molded industrial products which are exposed to severe tearing, twisting, abrasion, impact, and other forces, have been manufactured with polyurethane compositions reinforced with such materials as polyester fiber, yarn, or fabric. One of the problems with polyester reinforcing materials is that they must be precoated with an adhesive; for example, an isocyanate system in order to adhere to the polyurethane composition for the purpose of improving the physical properties of the final product. The precoating step is costly and the adhesive strength provided by the coated fibers tends to diminish with time and exposure of the material to moist conditions.

Another problem occurs with products such as snowmobile tracks and power transmission belts which are longitudinally and/or transversely reinforced with cord or fabric. The dimensional tolerances in these products are critical, and elaborate precautions must be taken to prevent the reinforcing member from shrinking during the curing process. For example, to obtain dimensional stability with polyester reinforced materials, it is necessary either to restrain the product from shrinking if the curing process is carried out at a high temperature or to use a relatively long curing cycle if the curing process is carried out at a low temperature, below the shrinkage temperature of the polyester. Thus, the polyester reinforcing materials have serious disadvantages because on the one hand expensive mandrels must be used at high temperatures and on the other hand expensive and inefficient curing cycles must be used at low temperatures.

It is known in the art that the physical properties of reinforced polyurethanes can be improved by the addition of fibrous material. For example, improved tear resistance has been found to occur when fibrous flock, such as cellulose flock, nylon flock, glass flock, and wool flock, is used as a filler in a polyurethane polymer, as disclosed in U.S. Pat. No. 2,751,363. Polyurethane foams have been improved in physical properties by the addition of short length nylon, wool, silk, hair, and protein fibers, as disclosed in U.S. Pat. No. 2,763,624. Also, glass fibers have been used to reinforce nonelastomeric polyurethanes to produce low elongation properties, as disclosed in U.S. Pat. No. 3,464,935.

To improve the physical properties of the polyurethane compositions of the prior art, such compositions have been reinforced with various materials such as polyester or nylon fiber, cord, and fabric. To provide increased physical properties, however, it has been found necessary to coat or pretreat the polyester reinforcing material with a treatment system such as an organic isocyanate solution. One dip material which has been used with some success is polymethylene polyphenyl isocyanate resin, distributed under the trademark "Papi" by Upjohn Chemical Company. The obvious disadvantage to dipped reinforcing material is that the added coating step is quite expensive and the treated material has limited shelf life. Nylon fibers, cords, or fabrics have also been used as reinforcing elements in polyurethane compositions, but they must be treated with a suitable adhesive system and suffer the additional disadvantage that they may show high elongation in service and in general show poor dimensional stability. Cellulosic fibers, such as rayon or cotton, are generally deficient in terms of strength and fatigue stability.

None of the above compositions, however, have provided a balanced blend of physical properties of the type required for transmission belts, snowmobile tracks, and the like. Nor have they enabled dimensional stability to be maintained at high temperatures or provided increased productivity for such products.

SUMMARY OF THE INVENTION

The present invention is directed to improve polyurethane compositions in which a strong chemical adhesion is obtained between the reinforcing material and the polyurethane material. In general, the invention increases tear strength, modulus, and dimensional stability at high temperatures, so that snowmobile tracks and power transmission belts may be fabricated with improved processing efficiency.

The basic combination of the present invention comprises a mixture of a polyvinyl alcohol (PVA) reinforcing material with low affinity for water and a polyurethane polymer or prepolymer which is the reaction product of an organic diisocyanate and a material selected from the group consisting of polyesters and polyethers. The improved properties of the present invention are believed to result from a reaction between pendant hydroxyl groups on the PVA material and terminal isocyanate groups on the polyurethane chain by which the polyurethane chemically bonds with the PVA reinforcing material. A mechanical adhesion supplements the chemical bonding and contributes to the improved properties.

The PVA material is utilized as a continuous reinforcing member in the form of cord or fabric with the PVA material being present in the polyurethane polymer in varying proportions depending upon the end product desired. In general, the PVA material comprises up to about 50 percent by weight of the mixture when used as reinforcements for such products as transmission belts or snowmobile tracks. For other types of products, however, the ratio may be as high as 90 percent. The resultant compositions resist shrinkage at high temperatures, expedite the curing process, and provide increased processing characteristics not heretofore possible. Such compositions can be cured faster at high temperatures and do not require expensive curing apparatus.

DESCRIPTION OF THE PREFERRED EMBODIMENT

Figure 1:
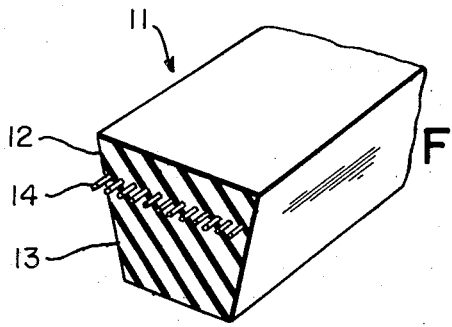
FIG. 1 illustrates a segment of a typical transmission belt (V-belt) shown in perspective, indicating the relationship of the strength cords and the body.

Products such as snowmobile tracks and power transmission belts which are manufactured from elastomeric polyurethane compositions and which require exceptional physical properties, also have the requirement that they must maintain their dimensional stability throughout the wide temperature ranges encountered in processing.

The novel elastomeric urethane compositions of the present invention not only overcome the disadvantages of the precoated reinforcing materials referred to earlier, but also provide significant processing advantages for certain types of products. The present invention is directed to the combination comprising a mixture of a polyvinyl alcohol (PVA) reinforcing material and a polyurethane polymer or prepolymer. This combination increases the tear strength, modulus, improved dimensional stability at high temperatures, and low elongation properties, so that snowmobile tracks and power transmission belts may be fabricated with improved processing efficiency without the necessity of taking elaborate precautions against shrinkage. The chemical reaction (adhesion) we have discovered of the PVA reinforcing element with the urethane polymer occurs at the surface of the individual PVA filaments of the cord or fabric during the urethane polymerization process which may take place either by polymer formation (one-shot process) or by chain extension (prepolymer process). The adhesion between the reinforcing PVA cord or fabric and the polyurethane matrix appears to result from reaction of some of the pendant hydroxyl groups believed to be present on the filaments of the PVA cord or fabric with some of the terminal isocyanate groups of the growing polyurethane polymer matrix. This is illustrated in the following structural formulae, and shown graphically in FIG. 4:

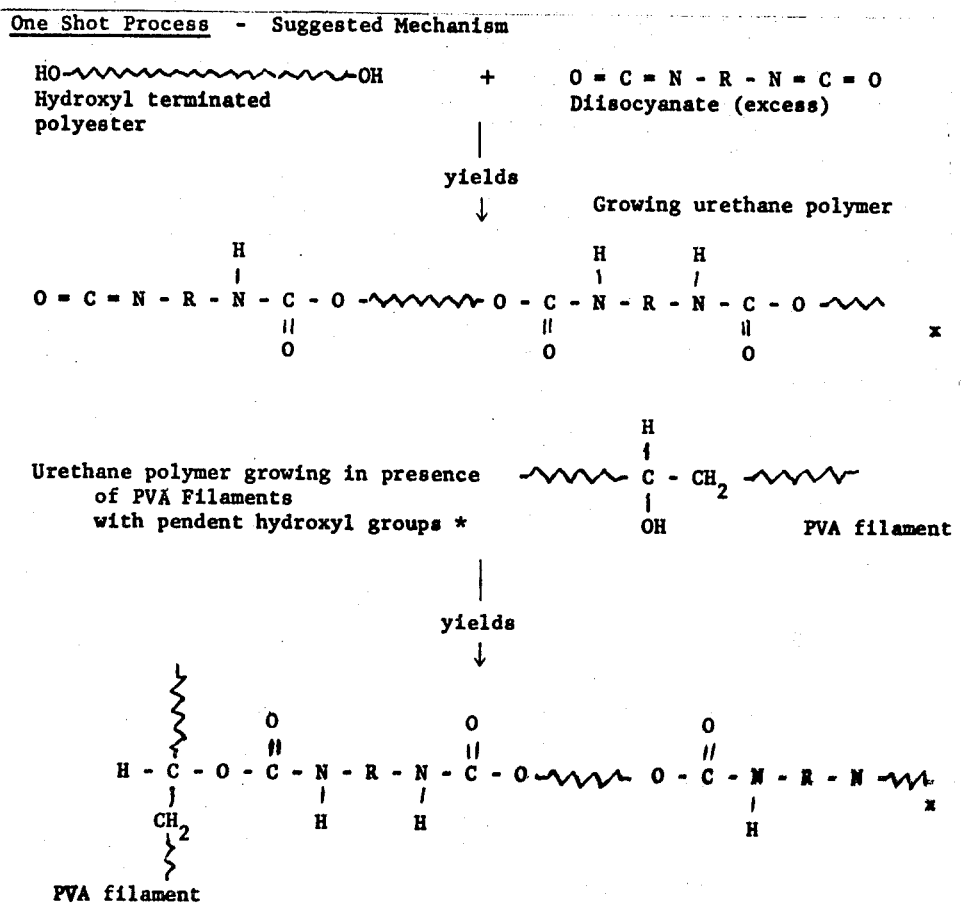

Prepolymer Process – Suggested Mechanism

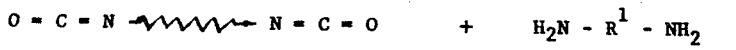

Isocyanate terminated            Di-amine curative
prepolymer

Yields ↓

Growing (chain extended) urethane polymer

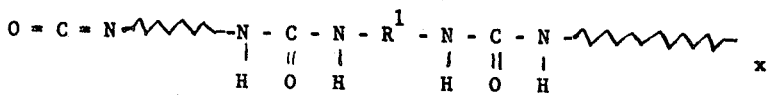

Urethane polymer growing in
presence of PVA filaments
with pendent hydroxyl groups *

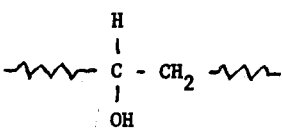

PVA Filament

Yields ↓

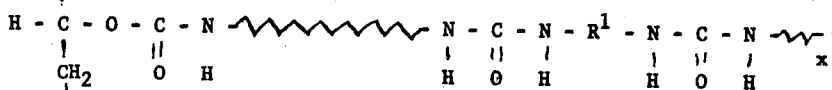

PVA filament

* Growth of polymer and interaction of growing polymer with PVA filament are felt to occur simultaneously.

It is important to note that our discovery relates to a reaction and subsequent molecular attachment of some of the urethane polymer molecules and the PVA cord or fabric filaments. Other patents (for example, German Pat. No. 1,905,551) refer to combinations of PVA and various polyurethane materials, but the desirable features claimed in the above-mentioned prior disclosures directly or indirectly imply that there is essentially no reaction and no subsequent adhesion of the PVA and the polyurethane elements.

Certain types of PVA cords or fabrics have been found to offer a number of significant advantages as reinforcing elements in highly stressed elastomeric articles such as V-belts and snowmobile tracks. These advantages include our discovery that the necessary adhesion between the PVA cord or fabric reinforcing elements and the polyurethane matrix can be obtained without the need to pretreat the PVA cord or fabric reinforcing elements with expensive, moisture-sensitive bonding systems. Since no bonding system is used, storage stability is virtually unlimited. Additional advantages accrue from the fact that PVA cord or fabric reinforcing elements are dimensionally stable (i.e., do not shrink appreciably) at polyurethane polymerization and curing temperatures. Of course, the physical properties of the PVA cord or fabric elements must be such that a satisfactory level of reinforcement is obtained in the finished product.

The choice of PVA type to be used in conjunction with the cast urethane materials is vital to the resultant properties of the PVA/polyurethane system which is the subject of our invention.

PVA materials differ in their degree of water solubility. Our invention relates to the type of PVA exemplified by Kuralon No. 1,239, which due to its high orientation and crystallinity shows extremely low water solubility, high modulus, high tenacity, and low heat shrinkage. While it is felt that a similar type of PVA/polyurethane interaction will take place with systems of cast polyurethanes and cords or fabrics made from more hydrophilic PVA, they will not impart the high level of reinforcement shown by the Kuralon No. 1239 type materials. In addition, their hydrophilic nature would cause problems such as wicking and stretching, and would probably hasten environmental degradation of the urethane matrix.

The adhesion effect we have discovered can be measured by means of the H Adhesion Test (ASTM - D2138-67). The following polyurethane composition was chosen to demonstrate this effect:

| Part I | 100 | parts PP335 | Midwest Mfg., Burlington, Iowa |
|---|---|---|---|
| Part II | 14.5 | parts MOCA | |
| | 6 | parts Benzoflex 9-88 | |
| | 2 | parts TP-90B | |
| | 0.2 | parts Black Dye | |

Part I and Part II are heated separately to 85°C. ±5°C., degassed, mixed, poured into prepared H sample molds in which sample cords had been previously positioned, and cured for four hours at 107°C. Samples were removed from the mold upon cooling and permitted to age at room temperature for 4 days before testing.

The cords used in this demonstration were chosen because of similar denier and tensile strength. The following information was obtained:

|  | Sample A | Sample B | Sample C |
|---|---|---|---|
| Cord Type | du Pont T-53 Polyester | du Pont T-53 Polyester | Kuralon No. 1239 Polyvinyl Alcohol |
| Construction | 1100/2/3 | 1100/2/3 | 1200/200f 5 ply |
| Tensile Strength | 99 lbs. | 101 lbs. | 98 lbs. |
| Adhesion Treatment | None | Papi | None |
| Pound pull at failure | 12.8 | 15.2 | 20.3 |

It is obvious that the adhesion between the PVA cord and the polyurethane matrix (Sample C) is superior to that obtained with the polyester cord, whether treated (Sample B) or untreated (Sample A). The reasons for testing both treated and untreated polyester (instead of just treated polyester) were first to confirm that the treatment on the polyester had not degraded due to contamination with adventitious moisture, and secondly, to evaluate the effect of purely mechanical interlock adhesion.

Figure 3:
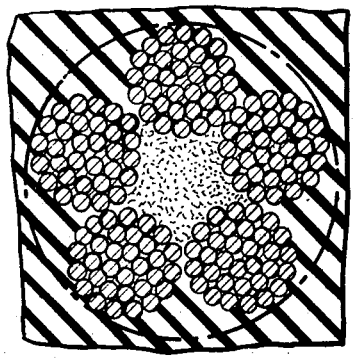
FIG. 3 is an enlarged sectional view illustrating a typical prior art product in which a treated cord is not penetrated by the composition.
Figure 4:
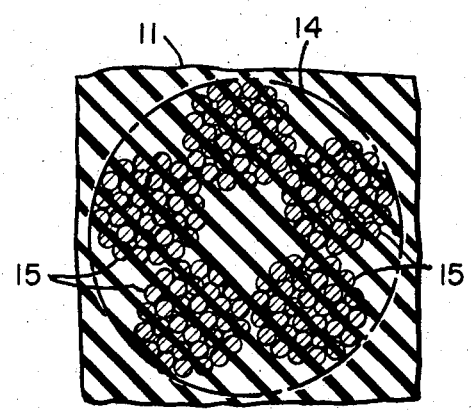
FIG. 4 is a view similar to FIG. 3 illustrating the arrangement of the present invention in which the PVA cord is penetrated by the urethane composition.

The mechanical interlock effect results from the fact that in the (untreated) PVA cord the cast urethane, while in its liquid state, penetrates throughout the cord structure as illustrated in FIG. 4, but in the case of the treated polyester cord, little or no penetration is observed because the treatment tends to seal the cord structures as illustrated in FIG. 3. It was felt that this mechanical interlock of untreated cord and the urethane matrix could result in misleading adhesion values in the H test. It is again obvious from the results of the data shown above (compare Sample A with Sample C) that in fact true chemical adhesion exists between the PVA cord filaments and the urethane matrix.

We believe that the penetration of the untreated PVA as noted above is beneficial inasmuch as it results in the insulation (via encapsulation) of individual PVA filaments within each cord of the reinforcing member. This should result in improved dynamic fatigue life in elastomeric polyurethane articles fabricated with PVA cord or fabric reinforcement, as compared to similar articles fabricated with, for example, treated polyester cord or fabric.

We have made snowmobile tracks and V-belts from cast polyurethane reinforced with PVA cord or fabric elements, and tested these against similar articles fabricated from cast polyurethane reinforced with equivalent treated polyester cord or fabric elements, with excellent results. A significant reduction in cost of these products was realized in the case of the PVA cord or fabric reinforcing elements due to elimination of the need for cord or fabric treatment, reduction in cord or fabric scrap due to the unlimited shelf life of the untreated PVA materials, and the ability to post cure without restraints on the finished articles due to the superior dimensional stability of the PVA cord or fabric elements at the polyurethane post curing temperatures.

The superior dimensional stability of PVA cords and fabrics at the curing and post curing temperatures of the cast polyurethane materials is shown in the following chart:

|  | Sample 1 | Sample 2 | Sample 3 |
|---|---|---|---|
| Cord Type | Polyester | Polyamide (Nylon 6) | Polyvinyl Alcohol |
| Construction | 1100/192f | 840/140f | 1200/200f |
| Heat Shrinkage (%) |  |  |  |
| at 80°C. | 0.4 | 1.9 | 0.5 |
| at 100°C. | 1.0 | 2.8 | 0.8 |
| at 120°C. | 2.4 | 4.3 | 1.0 |
| at 140°C. | 5.1 | 5.7 | 1.0 |

The practical application of the superior dimensional stability of PVA cords or fabrics at elevated temperatures was demonstrated by building a sleeve of polyurethane V-belts using untreated PVA cord reinforcement (Kuralon No. 1239, 1200/200f). The belt sleeve was initially cured on the mandrel (i.e., restrained) for 60 minutes at 220°F., after which the sleeve was removed and cut in half perpendicular to the axis of the sleeve. Half of the belt sleeve was set aside, while the other half was given an additional cure of 180 minutes at 220°F. in the unrestrained condition. Both halves were then measured and found to fall within acceptable tolerance, as shown below.

| Center distance length specification for belt | 19.015"±.125" |
|---|---|
| Measured length of belt cured on mandrel (60 min. at 220°F.) | 19.015"–19.080" |
| Measured length of belt cured on mandrel (60 min. at 220°F.) then post cured off mandrel (180 min. at 220°F.) | 19.007"–19.060" |

It has been demonstrated that a polyester or nylon cord reinforced belt of this type, when heated under these conditions in an unrestrained state, will show excessive shrinkage, such that the finished belt will not meet dimensional tolerances as shown above.

The use of PVA cords and fabrics as reinforcing elements in elastomeric polyurethane articles such as V-belts and snowmobile tracks permits such articles to be cured more economically than is the case when using polyester of polyamide (nylon) reinforcing elements. This advantage arises from the superior dimensional stability of PVA cords and fabrics at elevated temperatures, which permits the removal of such PVA cord or fabric reinforced articles from the mold or mandrel at an early stage in the cure (i.e., soon after the polyurethane matrix has gelled in its final form, but before the development of optimum physical properties). The PVA cord or fabric reinforced article may then be post cured (to develop optimum physical properties in the polyurethane matrix) in an unsupported condition, thereby liberating expensive molds or mandrels for the building of further products. Additionally, because post curing may be carried out on such articles without the need for bulky molds or mandrels, smaller (and therefore less expensive) curing ovens may be utilized. Alternatively, more efficient use may be made of existing curing facilities, especially since higher curing temperatures are possible when using PVA cord or fabric reinforcement.

FIG. 1 illustrates a cross section of a typical transmission belt, also referred to as a V-belt, which is a practical embodiment of the invention. The body of the belt 11 is formed of the polyurethane material and includes a compression section 12 and a tension section 13. A series of longitudinally extending strength cords 14 are formed of the PVA material and are embedded within the body material to create the composition described above. The unusually powerful bond between the body or matrix and the cord creates a highly desirable end product. The cord 14 is illustrated in FIG. 4 as being comprised of a plurality of individual yarns 15, each in turn formed of fibers. As can be seen, the matrix material 14 completely penetrates and bonds to the cord, in contrast to a non-penetrating structure as shown in FIG. 3.

Figure 2:
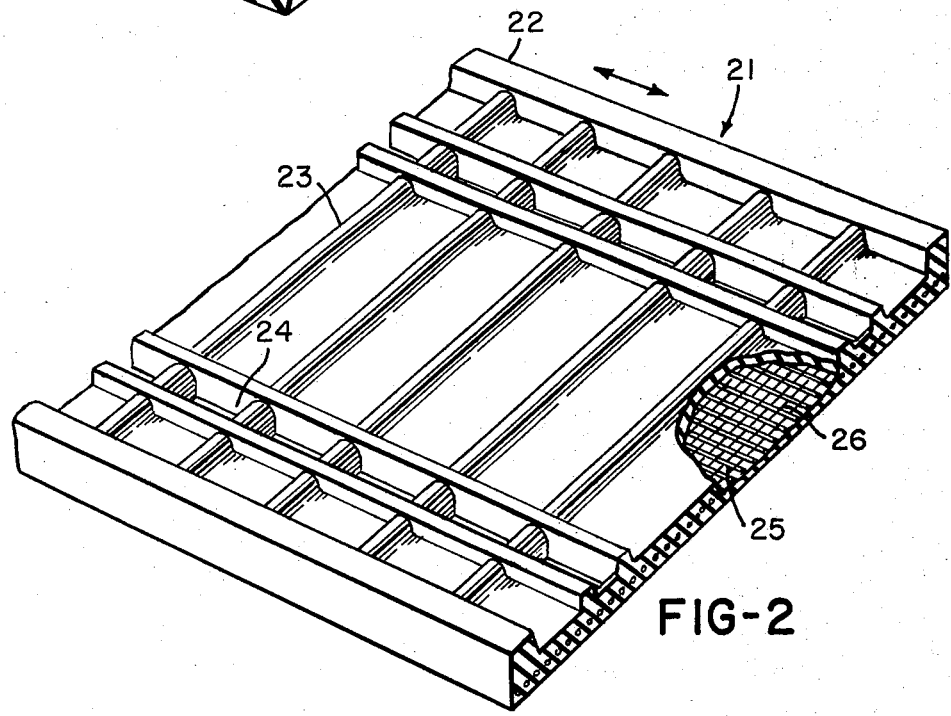
FIG. 2 illustrates a segment of a typical snowmobile track in perspective and showing the relationship of a reinforcing fabric and the body.

FIG. 2 illustrates a segment of a typical snowmobile track, which is another practical embodiment of the invention. The track 21 includes longitudinally extending end ribs 22, lateral reinforcing members 23, and sprocket holes 24. It is understood that this track design is merely exemplary. The track is made of the polyurethane material described above, and embedded therein is a continuous prestructured reinforcing woven member composed of longitudinal cords 25 and lateral cords 26. The longitudinal cords are PVA material as described above, and bonded within the polyurethane matrix. The lateral cords may also be PVA. It is also possible to omit the lateral cords completely and retain the longitudinal cords by wrapping a single cord continuously around a building drum in the manner of a V-belt sleeve. It is also possible to substitute a braided or knitted fabric during fabrication in lieu of the woven fabric.

In addition to the PVA cord and fabric reinforcement structures described above, it is also within the scope of our invention to use blends and combinations of PVA with other materials such as cotton, rayon, polyester, and/or nylon. By blends, we mean the mixture of PVA with one or more other materials within a single yarn. By combinations, we mean first, single cord constructions made by twisting PVA with one or more different types of yarns together and, second, woven, braided and knitted fabric constructions made from the aforementioned cord combination or from PVA with one or more different types of homogenous cords or yarns. In structures such as these, the PVA would provide a level of chemical adhesion dependant on the amount of PVA present in the structure and the mechanical adhesion effect noted previously would be evident because of the absence of adhesion treatment of the structure.

The PVA reinforcing material has been found to be useful when it is present in the polyurethane polymer in varying proportions depending upon the desired product. The PVA material may comprise as much as 90 percent by weight of the total composition when used for certain products, but is preferably 50 percent or less by weight when used as a reinforcement for belts or snowmobile tracks. The specific percentage may be controlled by varying the spacing or diameter of the cords, the number of layers of cords, and the amount of polyurethane utilized.

While the compositions and products herein described constitute preferred embodiments of the invention, it is to be understood that the invention is not limited to these precise compositions and products, and that changes may be made therein without departing from the scope of the invention which is defined in the appended claims.

We claim:

1. A polyurethane elastomer composition characterized by improved tear strength and dimensional stability, comprising a polyurethane material which is the reaction product of an organic polyisocyanate and a material selected from the group consisting of polyesters and polyethers, said polyurethane having terminal isocyanate groups, and an untreated polyvinyl alcohol cord present as a reinforcing material for said polyurethane and constituting up to about 90 percent by weight of the total polyurethane-polyvinyl alcohol mixture, said cord comprising a plurality of individual yarns each formed of fibers and having pendant hydroxyl groups, said polyurethane material cured in admixture with said cord to enable said isocyanate groups to react with said hydroxyl groups and said cord to establish chemical bonds, said polyurethane material penetrating said cord to further establish mechanical bonds.

2. The composition of claim 1 in which said cord constitutes a continuous reinforcing member.

3. The composition of claim 1 made in the form of a power transmission belt, said polyurethane material comprising the body of said belt and said polyvinyl alcohol cord forming longitudinally extending strength cords within said body.

4. The composition of claim 1 made in the form of a snowmobile track, said polyurethane material comprising the body of said track and said polyvinyl alcohol cord forming reinforcing members embedded within said body.

5. The composition of claim 4 in which said cord extends longitudinally of said track.

6. The composition of claim 1 in which said cord is incorporated within a woven fabric.

7. The composition of claim 1 in which said cord is incorporated within a knitted fabric.

8. The composition of claim 1 in which said cord is incorporated within a braided fabric.

* * * * *